United States Patent

Daghe et al.

[11] Patent Number: 5,836,340
[45] Date of Patent: Nov. 17, 1998

[54] AUXILIARY GAS CONNECTION FOR METER SETS

[75] Inventors: Joseph L. Daghe, Dubuque, Iowa; John Eckel, Hazel Green, Wis.

[73] Assignee: A. Y. McDonald Mfg. Co., Dubuque, Iowa

[21] Appl. No.: 588,206

[22] Filed: Jan. 19, 1996

[51] Int. Cl.⁶ .................................................. F16K 43/00
[52] U.S. Cl. ...................... 137/112; 137/594; 137/599.1; 251/148
[58] Field of Search .................... 137/112, 594, 137/599.1; 251/148

[56] References Cited

U.S. PATENT DOCUMENTS

| | | | |
|---|---|---|---|
| 2,579,656 | 12/1951 | Douglas et al. | 137/599.1 X |
| 3,007,491 | 11/1961 | Evans | 137/599.1 |
| 3,272,009 | 9/1966 | Leopold et al. | 137/599.1 X |
| 3,444,724 | 5/1969 | Gilpin | 137/599.1 X |
| 3,550,612 | 12/1970 | Maxon | 137/112 |
| 5,020,774 | 6/1991 | Christianson | 251/148 X |
| 5,437,300 | 8/1995 | Winnie et al. | 137/112 |

*Primary Examiner*—Stephen M. Hepperle
*Attorney, Agent, or Firm*—Wood, Phillips, VanSanten, Clark & Mortimer

[57] ABSTRACT

An improved meter bar assembly including an elongated casting (10) having threaded inlet and outlet ports (18) and (30) along with spaced, threaded swivel receiving ports (22), (36). Shoulders (54) are located in each of the swivel receiving ports (22), (36) and an auxiliary port (70) is also located in the casting. A cylindrical tube (72) is disposed in the auxiliary port and extends into the casting (10) to provide a mechanical barrier between the outlet port (30) and the swivel port (36). A cap (76) is provided for the tube (72) and a check valve (78) disposed within the tube (72). A pair of swivel tubes, (28) and (40) are threaded into the ports (22), (36) and one of the swivel tubes (40) includes an internal check valve (96). Both swivel tubes are provided with stop surfaces (50) that abut the shoulders (54) of the associated swivel tube receiving ports to positively locate the swivel tubes (28) and (40) in the meter bar (10) and with respect to one another.

13 Claims, 3 Drawing Sheets

AUXILIARY GAS CONNECTION FOR METER SETS

FIELD OF THE INVENTION

This invention relates to meter bar assemblies for mounting meters for metering the flow of gas such as natural gas, and more particularly, to such an assembly that is provided with an auxiliary gas connection port.

BACKGROUND OF THE INVENTION

Conventional meter bar assemblies typically include a casting that includes inlet and outlet ports, the former adapted to be connected to a source of natural gas and the latter adapted to be connected to points of use requiring the gas as fuel. Associated with the inlet port is a first swivel tube port while a similar swivel tube port is associated with the outlet as well. In the usual case, both of the swivel tube ports are in a common side of the meter bar assembly and generally in the same plane.

Swivel tubes are received in their respective ports and each terminates in a swivel nut which is threaded to a corresponding port on a gas meter and which thereby mounts the gas meter to the meter bar assembly.

In the usual case, upstream of the inlet port on the meter bar assembly, a main gas valve will be interposed between the meter bar assembly and the source of gas. When it is the desire to remove, replace or service the meter, this valve is closed to enable disconnection of the meter from the swivel tubes of the meter bar assembly by unthreading the swivel nut on each swivel tube.

In many cases, such a procedure is unsatisfactory. Because it requires turning off the gas, it follows that all gas consuming appliances connected to the meter will lose their source of fuel. Frequently, this may require the reigniting of several pilot lights and precludes use of the appliance for so long as the gas main is disconnected from the meter bar assembly by the valve.

To avoid this problem, it has been proposed to provide an auxiliary port in the swivel tube on the outlet side of the meter bar assembly. The auxiliary port may be connected to an auxiliary source of gas as, for example, a pressure vessel containing liquified natural gas. By connecting the auxiliary source to the swivel tube on the outlet side of the gas meter prior to disconnecting the gas main from the meter bar assembly, gas is provided to prevent the need for reigniting pilots and allows gas appliances to continue in use. This approach is exemplified in U.S. Pat. No. 5,178,188 issued to Russell on Jan. 12, 1993.

Unfortunately, this approach has a number of undesirable features. For one, the swivel tubes are threaded by conventional pipe threads into swivel tube receiving ports in the meter bar assembly. Conventional pipe threads are sufficiently coarse that one swivel tube may be threaded considerably deeper into the meter bar assembly than another with the consequence that the meter connecting ends of the swivel tubes are not co-planar. As a consequence, considerably difficulty may be experienced in getting a proper seal between the swivel tubes and the meter.

This same factor also allows the auxiliary port on the swivel tube at the outlet side of the meter to have substantial variance in its angular position relative to the meter bar assembly. As a consequence, the auxiliary port may not be readily accessible for connection to an auxiliary source of gas. Consider, for example, the possibility where the auxiliary port faces to the rear of the meter bar assembly or even toward the swivel tube on the inlet side of the meter.

Another difficulty arises in the fact that in the usual case, the swivel tubes on the inlet and outlet side of the meter are interchangeable. As a consequence, one seeking to obtain unmetered fuel may simply, after turning off the main valve to the inlet side of the system, interchange the swivel tubes by placing the outlet side swivel tube with the auxiliary port on the inlet side and the inlet side swivel tube on the outlet side of the meter. As a consequence, the system now has a port in the form of the auxiliary port upstream of the meter through which fuel may be withdrawn before it passes through the meter.

The present invention is directed to overcoming one or more of the above problems.

SUMMARY OF THE INVENTION

It is the principal object of the invention to provide a new and improved meter bar assembly.

More specifically, it is an object of the invention, according to one facet thereof, to provide a meter bar assembly that includes an elongated casting with spaced, threaded inlet, auxiliary and outlet ports in the casting. Two spaced, threaded swivel receiving ports are disposed in the casting and open to a common side of the casting. One of the swivel ports is connected to the inlet port and the other is connected to the outlet port. A shoulder is located in each of the swivel receiving ports and a pair of swivel tubes are provided, one threaded into each swivel port. Each swivel tube includes a stop surface abutted against the shoulder of the associated swivel port and swivel nuts are disposed on each of the swivel tubes.

In one embodiment of the invention, each of the shoulders is annular and each stop surface includes a generally axially facing, annular surface on the exterior of the corresponding swivel tube.

In a highly preferred embodiment of the invention, a seal receiving annular groove is located adjacent each of the shoulders and an O-ring seal is located in each such groove and sealingly engages the corresponding axially facing annular surface.

Accordingly to another facet of the invention, there is provided a meter bar assembly that includes a casting with spaced inlet and outlet ports. Two spaced, threaded swivel receiving ports are located in the casting and open to a common side of the casting with one being connected to the inlet port and the other being connected to the outlet port. An auxiliary port is located in the casting and is in fluid communication with the outlet port thereof. A first check valve is located in the auxiliary port for allowing fluid to pass into the auxiliary port but not the reverse. A closure is provided for the auxiliary port and pair of swivel tubes are provided, one in each swivel port. The swivel tube associated with the swivel port and the outlet port, at its end remote from the swivel port, includes an interior passage of relatively precise dimensions and a second check valve is located in the interior passage. Swivel nuts are provided on the swivel tubes as before.

In a preferred embodiment, the swivel receiving ports include female threads and the swivel tubes include male threads. The threads are about 12 threads per inch and sealant and thread locking compound is disposed on the threads.

One embodiment of the invention contemplates that the swivel receiving ports in the swivel tubes have inter-engaging threads and that the swivel receiving ports include shoulders with the swivel tubes including stop surfaces abutting the shoulders.

According to still another facet of the invention, there is provided a meter bar assembly that includes a casting with spaced inlet and outlet ports therein. Two spaced swivel receiving ports are located in the casting and open to a common side of the casting, one connected to the inlet port and the other connected to the outlet port. An auxiliary port is located in the casting and is in fluid communication with the outlet port. A check valve is located in the auxiliary port and a closure is provided therefor. Finally, there is provided a pair of swivel tubes, one in each swivel port.

In a highly preferred embodiment, a meter bar assembly includes an elongated casting with spaced, threaded inlet and outlet ports in the casting. Two spaced, threaded swivel receiving ports are located in the casting and open to a common side of the casting. One swivel port is connected to the inlet port and the other is connected to the outlet port. A shoulder is disposed in each of the swivel receiving ports and an auxiliary port is located in the outlet end of the casting in fluid communication with the outlet port. A cylindrical tube is disposed in the auxiliary port and extends into the casting to provide a mechanical barrier between the outlet port and the swivel port associated therewith. The barrier is such as to allow fluid to pass from the swivel port to the outlet port. A closure is provided for the tube and a first valve seat is located within the tube. A first spherical valve member is disposed within the tube and a pin is provided to extend across the tube in spaced relation the first valve seat for confining the first valve member within the tube in a position to open and close against the first valve seat. A pair of swivel tubes are provided with one threaded in each swivel port and each swivel tube includes a stop surface abutted against the shoulder of the associated swivel port. The swivel tube associated with the outlet port, at its end remote from the swivel port, includes an interior passage of relatively precise dimensions and a second valve seat is located in the interior passage. A second spherical valve member is located in the swivel tube associated with the outlet port and is positioned to open or close against the second valve seat. The second valve member is retained in the swivel tube by the cylindrical tube and by the second valve seat. The assembly is completed with swivel nuts, one on each of the swivel tubes.

In a preferred embodiment, the cylindrical tube includes at least one opening in a sidewall thereof at a location within the casting.

In a preferred embodiment, the swivel tubes are identical.

In a highly preferred embodiment, each stop surface is an annular surface on the exterior of the associated swivel tube and the assembly further includes an O-ring seal disposed in each swivel port radially inwardly of the associated shoulder and sealingly engaging the associated annular surface.

Other objects and advantages will become apparent from the following specification taken in connection with the accompanying drawings.

DESCRIPTION OF THE PREFERRED EMBODIMENT

Figure 1:
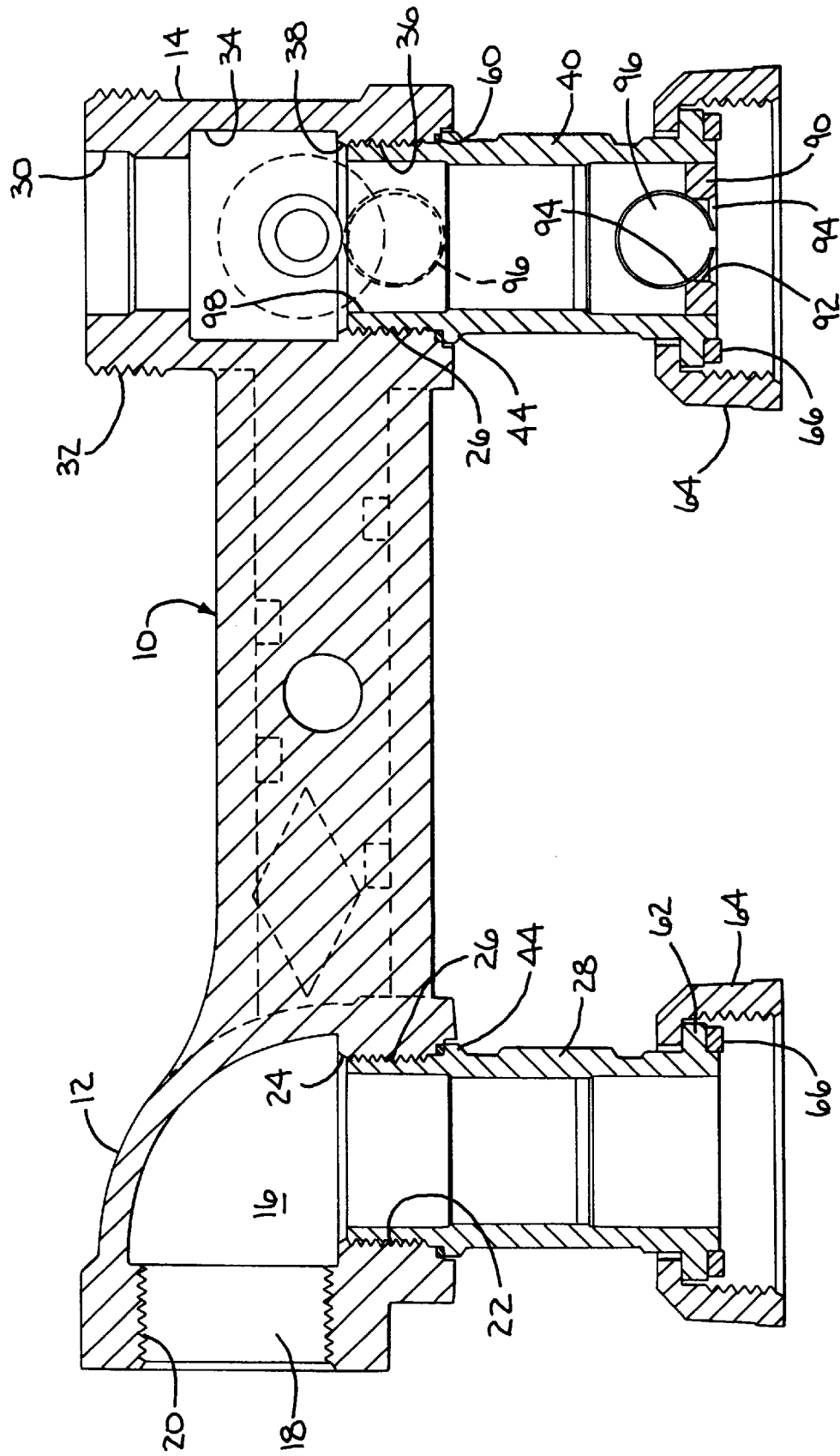
FIG. 1 is a vertical section of a meter bar assembly made according to the invention.

An exemplary embodiment of a meter bar assembly made according to the invention is illustrated in the drawings and with reference thereto, is seen to include an elongated meter bar, generally designated 10. Typically, the meter bar 10 will be a casting of cast iron and includes a bulbous formation 12 on its inlet and/or outlet side and/or a cylindrical, bulbous end 14 on its outlet side. As best seen in FIG. 1, the bulbous formation 12 includes an internal passage 16 that defines a 90° elbow within the casting 10. An inlet port 18 is provided at one side of the passage 16 and includes internal threads 20 which are conventional pipe threads. On the opposite side of the passage 16 is a swivel tube receiving port 22. The port 22 includes internal thread 24 for receiving the threaded end 26 of a swivel tube 28. The threads 24, 26 are not conventional pipe threads. Preferably, for typical diameters of swivel tubes 28 in the range of 1"–1¼" or 1½", a thread having 12 threads per inch is employed.

The cylindrical end 14 includes an outlet port 30 provided with exterior threads 32 and is joined by an interior cylindrical passage 34 to a second swivel tube receiving port 36 which is interiorly threaded as shown at 38 and which receives a second swivel tube 40. The swivel tube 40 may be, but need not be, identical to the swivel tube 28 to minimize the parts inventory necessary to make the meter bar assembly made according to the invention.

Figure 2:
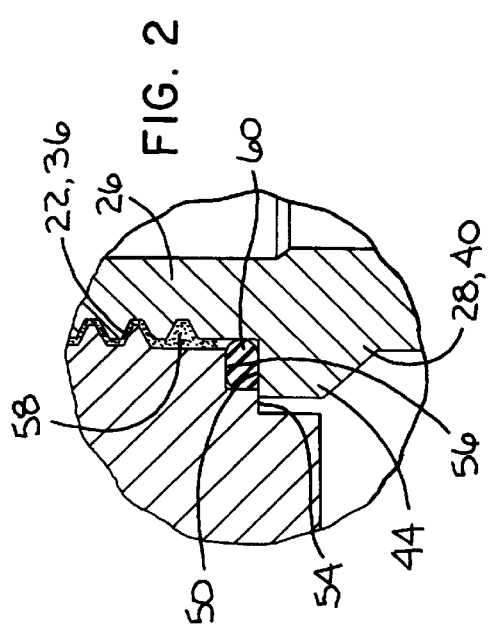
FIG. 2 is an enlarged, fragmentary, sectional view of a shoulder and stop surface construction employed in the invention.

As best seen in FIGS. 1 and 2, each of the swivel tubes 28, 40 is provided with an annular flange 44 which, on the side thereof adjacent the threaded end 26 of the corresponding swivel tube 28, 40, has an axially facing stop surface 50. In the usual case, the stop surface 50 will be planar.

As best seen in FIG. 2, each of the swivel tube receiving ports 22, 36, includes a first annular step 54 and a second annular step 56 radially inward of the first step 54. The arrangement is such that the first step 54 forms an annular shoulder whose radially inner diameter is less than the outer diameter of the flange 44. As a consequence, when a swivel tube 28 and 40 is threaded into the swivel tube receiving port 22, 36, the stop surface 50 will abut against the shoulder provided by the step 54 to limit further movement of the corresponding swivel tube 28, 40 and to the corresponding port. As a result, a positive stop is provided and regardless of any lack of precision that may exist in the threads 24, 38, the swivel tube 28 will be precisely positioned in the meter bar 10 as will be the swivel tube 40. In the usual case, the arrangement is such that both swivel tubes have faces for connection with a meter that are essentially co-planar to ensure ease of installation and the ability to obtain a leak free fit.

Preferably, a sealant and thread locking compound 58 is located in the threads 24 and 38 as illustrated in FIG. 2. Various compounds may be utilized such as those marketed under the trademarks "LOCTITE" or "PERMABOND".

To further seal the interface of the swivel tubes 28, 40 with the meter bar 10, O-ring seals 60 may be disposed on the step 56 against which they seal. In addition, as can be seen in FIG. 2, the O-ring seals 60 will also seal against the stop surfaces 50 on the corresponding swivel tube 28, 40.

Oppositely of the threaded ends 26 of the swivel tubes, the same include an annular flange 62 for receiving conventional swivel nuts 64. Conventional seals 66 may be located on the swivel tubes 28 and 40 within the confines of the associated nuts 64 to seal the connection of a gas meter thereto in a conventional fashion.

Figure 3:
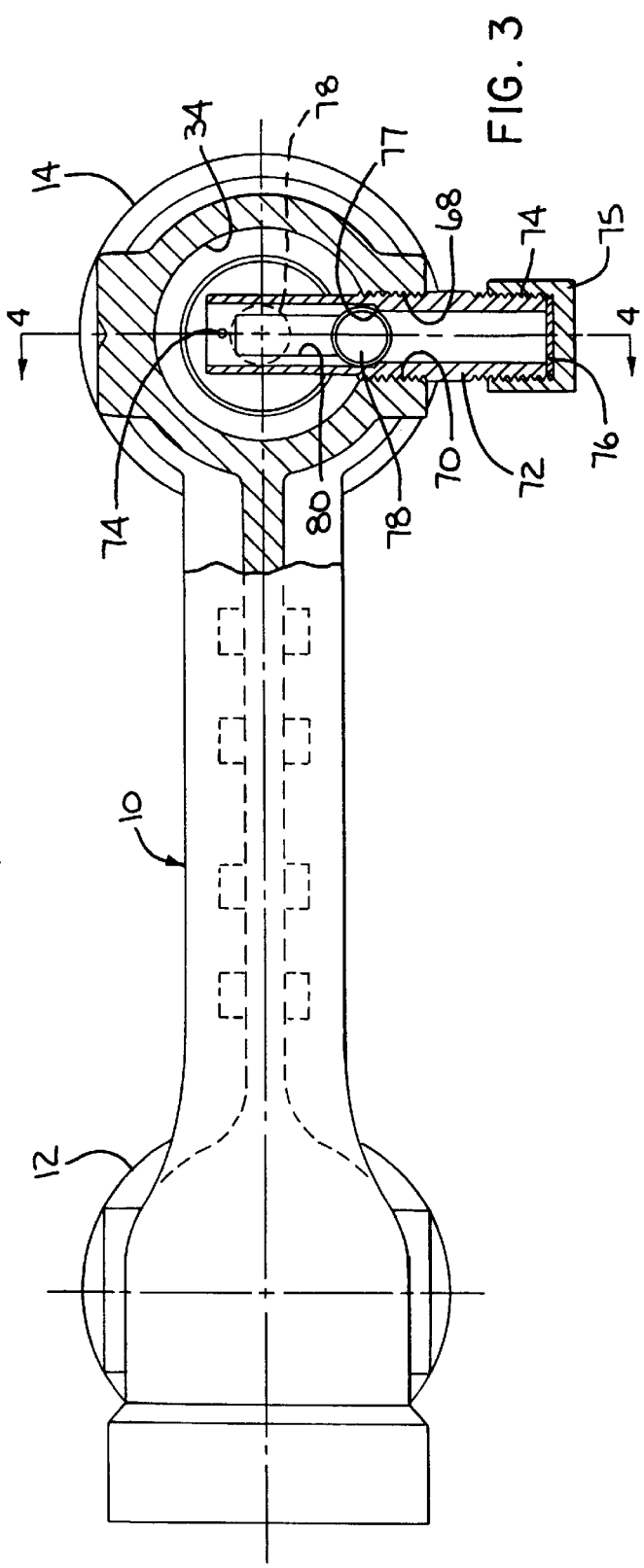
FIG. 3 is a plan view of the meter bar assembly with parts shown in section.
Figure 4:
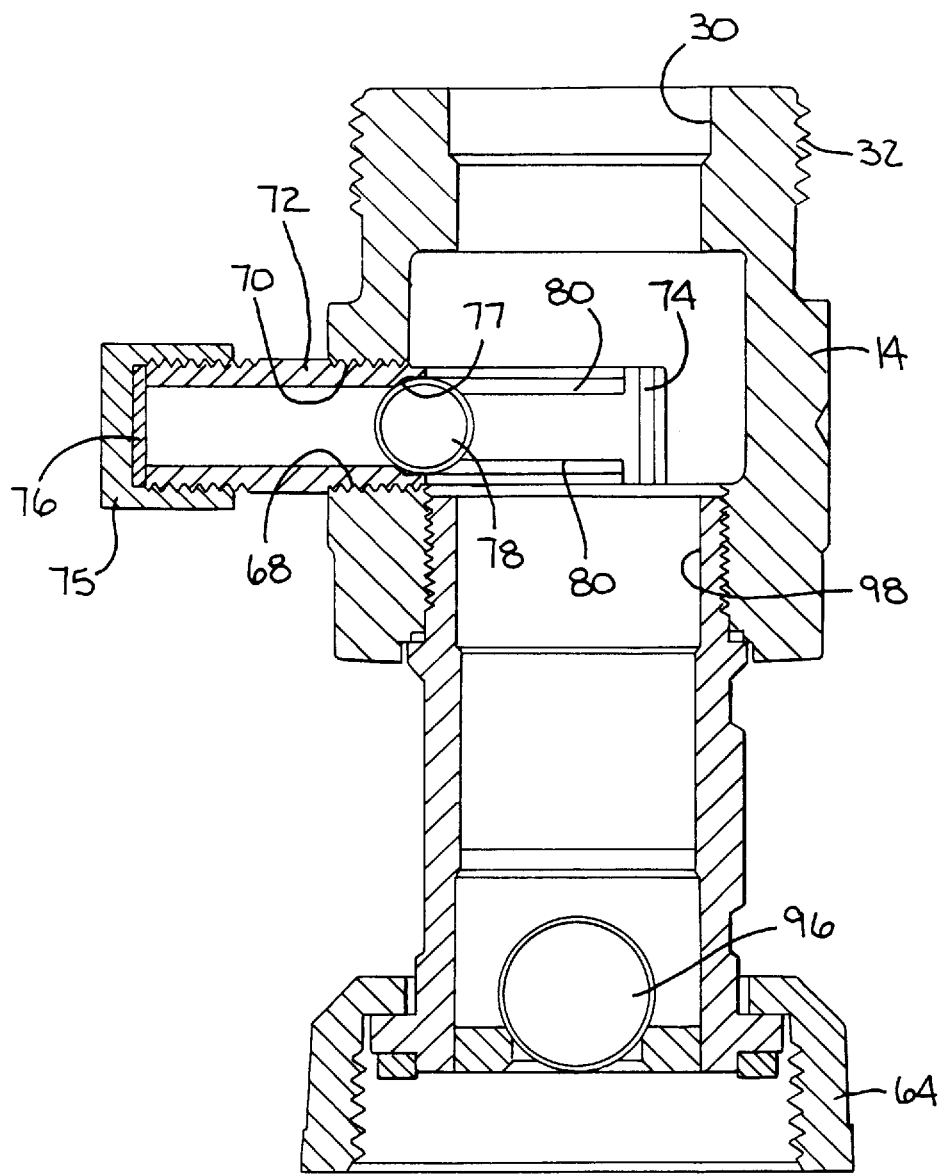
FIG. 4 is a vertical, sectional view taken approximately along the line 4—4 in FIG. 3.

As alluded to earlier, the invention specifically contemplates the provision for connection to an auxiliary source of gas. To this end, and as best seen in FIGS. 3 and 4, the casting forming the meter bar 10, in the cylindrical end 14, includes an auxiliary port 68 which is intended to open to the forward side of the assembly and which includes internal threads 70. A tube 72 may be threaded into the auxiliary port 68 so as to enter the interior chamber or passage 34 which interconnects the outlet port 30 and the associated swivel tube port 36. It will be noted that the tube extends substantially into the passage 34 and across the center line thereof, but does not block the flow of fluid, such as gas, from the swivel port 36 to the outlet port 30.

The exterior end of the tube 72 is threaded as at 74 so as to receive a removable cap or closure 75. A gasket 76 of rubber or other elastomer is located within the cap 76 to assure a good seal when the same is in place on the tube 72.

The end of the tube 72 within the bar 10 includes a retention pin 74 while the interior of the tube 72 includes a valve seat 76. Within the tube 72 is a spherical valve 78 which may be formed of a plastic such as nylon or high density polyethylene (HDPE). Within the bar 10, the tube 72 also includes opposed openings 80 in its sidewalls.

The spherical valve 78 acts as a check valve to prevent the flow of gas from the interior of the meter bar out of the tube 72 by seating against the seat 76. Conversely, it will allow flow of gas into the bar 10 by shifting from the solid line position illustrated in FIG. 3 to the dotted line position thereof whereat it abuts and is retained by the pin 74. In this location, the vast majority of the openings 80 are exposed to allow gas entering the tube 72 from the exterior of the assembly to flow into the interior passage 34.

As best seen in FIGS. 1 and 4, a check valve is also located in the swivel tube 40. A valve seat 90 is pressed fit into the lower end of the swivel tube 40 and includes a central opening 92 through which gas may pass. The points of emergence of the central opening 92 may be beveled on both sides as at 94 to provide valve seat surfaces whereby the valve seat 90 may be installed with either side entering the swivel tube 40.

A second spherical valve member 96, also of nylon or HDPE, is disposed within the swivel tube 40 and may seat against the valve seat surface 94 as illustrated in FIG. 1 to prevent flow from the interior of the passage 34 out of the swivel tube 40 while allowing flow into the swivel tube 40. In the case of the latter, the incoming gas may elevate the valve member 96 to the dotted line position shown in FIG. 1 whereat it will be retained within the assembly by interference with the tube 72 which acts as a specifically located mechanical barrier to further movement of the valve member 96.

Since the swivel tubes 28 and 40 will typically be formed by casting, and good dimensional control of the interior passages of such tubes is difficult to maintain in a casting procedure, it will generally be desirable to machine the interiors of the threaded ends 26 so that when the valve member 96 moves to the dotted line position and is retained there by the tube 72, an inadvertent narrowing of the passage within the swivel tube 40 as a result of inaccuracy in the casting procedure will not choke off or add undue resistance to gas flow. The machined area is designated 98 in FIGS. 1 and 4.

From the foregoing, it will be appreciated that difficulties heretofore encountered in connecting meters to meter bar assemblies because of the sloppiness of the connections of the swivel tubes to the meter bar is avoided through the use of the positive stops provided by the shoulders 54 and stop surfaces 50.

It will also be appreciated that the invention allows the use of an auxiliary gas source. Specifically, when a meter is to be serviced or removed, before turning off the main gas valve (not shown) it is only necessary to remove the cap 76 and connect the tube 72 to an auxiliary source of gas. When the cap 76 is removed, appreciable escape of natural gas within the system will not result even though the main gas valve remains on because gas passage out of the tube 72 will be blocked by the valve member 78 seating against the seat 77. This allows the connection to the auxiliary source to be made before gas is turned off.

At this point, the main gas valve may be turned off. However, gas flow to appliances and their pilots will be maintained by gas flowing from the auxiliary source into the system through the tube 72.

With the main gas valve turned off, the swivel nuts 64 may be uncoupled from the meter and the meter removed for servicing and/or replacement. At this time, appreciable escape of gas from the auxiliary source into the area containing the meter bar assembly cannot occur because the valve member 96 will be seated against it's seat 94, preventing such escape.

It will also be recognized that because the auxiliary port is disposed in the meter bar 10 itself, as opposed to in a swivel tube such as the swivel tube 40, the auxiliary port will always be located at the forward side of the meter bar assembly whereat it is readily accessible. Furthermore, because the auxiliary port is disposed in the meter bar, one cannot obtain unmetered gas through such port because it cannot be switched to the inlet side of the system as can be the case with auxiliary ports formed in the swivel tubes.

We claim:

1. A meter bar assembly comprising:

an elongated casting;

spaced, threaded inlet and outlet ports in said casting;

two spaced, threaded swivel receiving ports in said casting and opening to a common side of said casting, one connected to said inlet port and the other connected to said outlet port;

a shoulder in each of said swivel receiving ports;

an auxiliary port in said casting and in fluid communication with said outlet port;

a cylindrical tube in said auxiliary port and extending into said casting to provide a mechanical barrier between said outlet port and said other swivel port, said barrier allowing fluid to pass from said other swivel port to said outlet port;

a closure for said tube;

a first valve seat within said tube;

a first spherical valve member within said tube;

a pin extending across said tube in spaced relation to said first valve seat for confining said first valve member within said tube in a position to open and close against said first valve seat;

a pair of swivel tubes, one threaded in each swivel port, each swivel tube including a stop surface abutted against the shoulder of the associated swivel port;

the swivel tube in said another swivel port, at its end remote from said another swivel port, including an interior passage of relatively precise dimensions;

a second valve seat in said interior passage;

a second spherical valve member in said swivel tube in said another swivel port and positioned to open or close against said second valve seat, said second valve member being retained in said swivel tube in said another swivel port by said cylindrical tube and said second valve seat; and swivel nuts, one on each of said swivel tubes.

2. The meter bar assembly of claim 1 wherein said cylindrical tube includes at least one opening in a side wall thereof at a specific location within said casting.

3. The meter bar assembly of claim 1 wherein a sealant and thread locking compound is disposed between said swivel tubes and said swivel ports.

4. The meter bar assembly of claim 1 wherein each stop surface is an annular surface on the exterior of the associated swivel tube and further including an O-ring seal disposed in each swivel port radially inwardly of the associated shoulder and sealingly engaging the associated annular surface.

5. A meter bar assembly comprising:

a casting;

spaced, inlet and outlet ports in said casting;

two spaced, swivel receiving ports in said casting and opening to a common side of said casting, one connected to said inlet port and the other connected to said outlet port;

an auxiliary port in said casting and in fluid communication with said outlet port;

a first check valve in said auxiliary port;

a closure for said auxiliary port;

a pair of swivel tubes, one in each swivel port; and a second check valve in the swivel tube in the swivel port connected to said outlet port.

6. A meter bar assembly comprising:

a casting;

spaced, inlet and outlet ports in said casting;

two spaced, threaded swivel receiving ports in said casting and opening to a common side of said casting, one connected to said inlet port and the other connected to said outlet port;

an auxiliary port in said casting and in fluid communication with said outlet port;

a first check valve in said auxiliary port for allowing fluid to pass into said auxiliary port, but not the reverse;

a closure for said auxiliary port;

a pair of swivel tubes, one in each swivel port;

the swivel tube in said another swivel port, at its end remote from said another swivel port, including an interior passage of relatively precise dimensions;

a second check valve in said interior passage; and swivel nuts, one on each of said swivel tubes.

7. The meter bar assembly of claim 6 wherein said swivel receiving ports include female threads and said swivel tubes include male threads, said threads being about 12 threads per inch; and sealant and thread locking compound on said thread.

8. The meter bar assembly of claim 6 wherein said swivel receiving ports and said swivel tubes have interengaging threads, and said swivel receiving ports include shoulders, and said swivel tubes including stop surfaces abutting said shoulders.

9. The meter bar assembly of claim 8 wherein each of said swivel receiving ports includes an annular step just radially inward of the associated shoulder, and each said stop surface includes a generally axially facing exterior surface of sufficient radial extent as to a) engage the associated shoulder, and (b) overlie the associated step; and O-ring seal on each said step and sealingly engaging the associated axially facing exterior surface.

10. A meter bar assembly comprising:

an elongated casting;

spaced, threaded inlet and outlet ports in said casting;

two spaced, threaded swivel receiving ports in said casting and opening to a common side of said casting, one connected to said inlet port and the other connected to said outlet port;

a first shoulder in each of said swivel receiving ports;

a second shoulder in each of said swivel receiving ports and located radially inward of said first shoulder to define a seal receiving space;

annular seals abutting said second shoulders;

a pair of swivel tubes, one threaded in each swivel port, each swivel tube including a stop surface abutted against the first shoulder of the associated swivel port and the associated annular seal;

swivel nuts, one on each of said swivel tubes; and an auxiliary port in said casting and connected to said outlet port.

11. The meter bar apparatus of claim 10 wherein each said shoulder is annular and each said stop surface includes a generally axially facing, annular surface on the exterior of the corresponding swivel tube.

12. A meter bar assembly comprising:

an elongated casting;

spaced, threaded inlet and outlet ports in said casting;

two spaced, threaded swivel receiving ports in said casting an opening to a common side of said casting, one connected to said inlet port and the other connected to said outlet port;

a shoulder in each of said swivel receiving ports;

a pair of swivel tubes, one threaded in each swivel port, each swivel tube including a stop surface abutted against the shoulder of the associated swivel port;

each said shoulder being annular and each of said stop surface including a generally axially facing, annular surface on the exterior of the corresponding swivel tube;

swivel nuts, one on each of said swivel tubes;

an auxiliary port in said casing and connected to said outlet port;

a seal receiving, annular groove in each of said swivel receiving ports adjacent the corresponding shoulder; and an O-ring seal in each said groove and sealingly engaging the corresponding axially facing annular stop surface.

13. The meter bar apparatus of claim 12 wherein said auxiliary port is located in close proximity to said other swivel receiving port at a location between said other swivel receiving port and said outlet port and in a predetermined location with respect to the shoulder in said other swivel receiving port, a check valve in said casting and disposed therein through said auxiliary port to overlie the swivel tube in said other swivel tube receiving port, and a valve member movable within the swivel tube in said other swivel tube receiving port and confined in a predetermined area therein by said check valve.

\* \* \* \* \*